United States Patent
Ikeda et al.

(10) Patent No.: US 8,033,793 B2
(45) Date of Patent: Oct. 11, 2011

(54) IMPELLER

(75) Inventors: Kazuo Ikeda, Hiroshima-ken (JP);
Yasutaka Okuda, Hiroshima-ken (JP);
Ryouhei Adachi, Gunma-ken (JP);
Satoshi Maruyama, Gunma-ken (JP);
Satoshi Hoshino, Gunma-ken (JP)

(73) Assignees: Sigma Co., Ltd., Kure-shi, Hiroshima-ken (JP); Yamada Manufacturing Co., Ltd., Kiryu-shi, Gunma-ken (JP)

( * ) Notice: Subject to any disclaimer, the term of this patent is extended or adjusted under 35 U.S.C. 154(b) by 1097 days.

(21) Appl. No.: 11/889,160

(22) Filed: Aug. 9, 2007

(65) Prior Publication Data
US 2008/0104837 A1 May 8, 2008

(30) Foreign Application Priority Data
Nov. 2, 2006 (JP) ................. 2006-299634

(51) Int. Cl.
*B21D 53/78* (2006.01)
(52) U.S. Cl. ............... 416/185; 416/204 R; 416/224; 416/241 R; 416/244 R; 29/889.23; 29/889.4
(58) Field of Classification Search ............... 416/185, 416/204 R, 241 A, 244 R, 224, 188, 229; 29/889.23, 889.4
See application file for complete search history.

(56) References Cited

U.S. PATENT DOCUMENTS

| | | | |
|---|---|---|---|
| 2,220,669 A | 11/1940 | Allen | |
| 3,846,045 A * | 11/1974 | Mincuzzi | 416/230 |
| 4,762,465 A * | 8/1988 | Friedrichs | 416/185 |
| 4,850,818 A | 7/1989 | Kotera | |
| 6,100,611 A | 8/2000 | Nakase | |
| 2002/0187045 A1 | 12/2002 | Ijima et al. | |
| 2007/0154313 A1 | 7/2007 | Rush et al. | |

FOREIGN PATENT DOCUMENTS

| | | |
|---|---|---|
| DE | 1 051 644 B | 2/1959 |
| DE | 37 13 310 A1 | 8/1988 |
| GB | 909510 | 10/1962 |
| JP | 2003-3991 | 1/2003 |

* cited by examiner

*Primary Examiner* — Igor Kershteyn
(74) *Attorney, Agent, or Firm* — McGinn Intellectual Property Law Group, PLLC

(57) ABSTRACT

The present invention provides an impeller in which a metallic bush can be inserted correctly into a synthetic resin impeller main body manufactured by resin molding using a die, and a determination as to whether or not the impeller has been manufactured correctly can be made easily. The impeller comprises: a metallic bush comprising a circumferential boss portion having a substantially truncated cone-shaped throttle portion positioned on a front surface axial end side, a periaxial support boss portion positioned in an axial center, and a circumferential protruding portion positioned on a back surface axial end side; and an impeller main body made of synthetic resin and formed with a V-shaped bulging portion that bulges axially in the center of a front surface side of a disk-shaped vane portion fulcrum, in which a plurality of vanes are formed integrally on the periphery of the V-shaped bulging portion. An outer diameter of the circumferential protruding portion of the bush is formed to be smaller than an outer diameter of an axial end location of the throttle portion, the circumferential protruding portion is positioned on a back surface side of the V-shaped bulging portion, and the bush is inserted into the V-shaped bulging portion.

19 Claims, 10 Drawing Sheets

IMPELLER

BACKGROUND OF THE INVENTION

1. Field of the Invention

The present invention relates to an impeller in which a metallic bush can be inserted correctly into a synthetic resin impeller main body manufactured by resin molding using a die, and a determination as to whether or not the impeller has been manufactured correctly can be made easily.

2. Description of the Related Art

Conventionally, a pump such as a water pump is provided with an impeller constituted by a resin impeller main body portion formed with a plurality of vanes, and a metallic bush portion serving as a boss for supporting a drive shaft. Most of these impellers are formed by resin molding using a die. Japanese Unexamined Patent Application Publication 2003-3991 exists as an example of an impeller product formed by molding resin using a die and a core member.

In the invention described in Japanese Unexamined Patent Application Publication 2003-3991, a metallic boss is inserted in and attached to a V-shaped bulging portion of an impeller main body such that the V-shaped bulging portion on the impeller main body side can be formed in a compact shape, the thickness of the V-shaped bulging portion can be secured adequately, and the metallic boss can be attached to the impeller main body extremely securely.

One axial end side of the metallic boss portion takes a truncated cone shape, while the other axial end has anon-circular outer periphery to prevent idle rotation.

A throttle portion having a truncated cone shape is formed on the metallic boss. By inserting this part into the tip end of the V-shaped bulging portion on the impeller main body, the V-shaped bulging portion can be provided with an appropriate thickness corresponding to the throttle portion, and a sufficient dynamic strength can be secured without making the V-shaped bulging portion on the periphery of the inserted throttle portion of the metallic boss excessively thick. Thus, the impeller can be reduced in size.

SUMMARY OF THE INVENTION

The problems of the related art will now be described on the basis of FIG. 10. First, to satisfy the conditions described above, one axial end side of a metallic boss a portion is formed in a truncated cone shape, and the other axial end is formed with a non-circular outer periphery to prevent idle rotation (see FIG. 10A). Hence, the metallic boss a does not take a left-right symmetrical form in the axial direction (see FIG. 10A). Therefore, to ensure that the axial direction of the metallic boss a is in alignment with the axial direction of the impeller, the metallic boss a must be inserted in a fixed orientation. If not, the desired performance is not exhibited, and the required level of quality as an impeller is difficult to achieve. Hence, when performing casting using a die, the metallic boss a is mounted in the die so as to be appropriately oriented relative to the impeller main body.

A gate is provided to allow molten resin to flow into a molding void portion in a die b. More specifically, a disk gate portion which opens onto the molding void portion in a flat cylindrical shape is provided in a site at which molten resin is introduced evenly into the molding void portion. When disposing the metallic boss a in the die b, the metallic boss a is disposed such that an axial end portion thereof opposes the disk gate portion. The molten resin flowing through the gate is then introduced evenly into the molding void portion through a gap between the disk gate portion and the axial end portion of the metallic boss a.

Incidentally, a support pillar is provided in the molding void portion of the die b to ensure that the metallic boss a can be positioned accurately and attached while maintaining stability. However, the metallic boss a can be attached to the support pillar regardless of whether the axial orientation of the metallic boss a is correct or inverted, and therefore the metallic boss a may be attached with an incorrect axial orientation.

Moreover, as shown in FIGS. 10A, 10B, when the one axial end side and the other axial end side of the metallic boss a have identical outer diameters φo, molten resin flows into the molding void portion in the die b regardless of which axial side of the metallic boss a faces the disk gate portion side. In other words, the impeller main body into which the metallic boss a is inserted can be resin-molded not only when the axial orientation of the metallic boss a is correct, but also when the axial orientation of the metallic boss a is inverted (see FIG. 10E).

However, when the metallic boss a is inserted into the impeller main body such that the axial orientation thereof is opposite to the correct direction, the characteristics of the impeller itself are not exhibited sufficiently. For example, as shown in FIG. 10B, when a polygonal portion (hexagonal portion) of a periaxial support boss portion that functions to fix the periaxial direction of the metallic boss a is positioned toward the tip end side of the V-shaped bulging portion of the impeller main body, the thickness near the tip end side is particularly thin, and therefore, when a cooling/heating cycle (thermal amplitude) is applied, the resin may expand and contract due to the cooling and heating, causing cracks c to occur in the resin portion from the apex of the hexagonal portion (see FIG. 10F). Moreover, when a shape other than the polygonal shape of the thin periaxial support boss portion is positioned toward the tip end side of the V-shaped bulging portion of the impeller main body and a drive shaft is forcibly inserted into a boss hole in the metallic boss inserted in the V-shaped bulging portion of the impeller main body, the diameter of the metallic boss increases through expansion such that stress is applied to the synthetic resin V-shaped bulging portion, and eventually, cracks occur.

To avoid this problem, the axial orientation of the metallic boss a is confirmed visually when molding of the impeller is complete. However, it is extremely difficult to assess the difference between the two axial ends of the metallic boss a instantly through visual confirmation alone. Hence, the problem (technical problem or object) to be solved by the present invention is to prevent defects during the manufacture of an impeller using an extremely simple constitution, and when a defect occurs, to enable instant visual confirmation of the defect.

As a result of committed research conducted by the present inventor to solve the problem described above, an invention described in claim 1 is an impeller comprising: a metallic bush comprising a circumferential boss portion having a substantially truncated cone-shaped throttle portion positioned on a front surface axial end side, a periaxial support boss portion positioned in an axial center, and a circumferential protruding portion positioned on a back surface axial end side; and an impeller main body made of synthetic resin and formed with a V-shaped bulging portion that bulges axially in the center of a front surface side of a disk-shaped vane portion fulcrum, in which a plurality of vanes are formed integrally on the periphery of the V-shaped bulging portion, wherein an outer diameter of the circumferential protruding portion of the bush is formed to be smaller than an outer diameter of an axial end location of the throttle portion, the circumferential protruding portion is positioned on a back surface side of the V-shaped bulging portion, and the bush is inserted into the V-shaped bulging portion.

An invention described in claim 2 for solving the problem described above is an impeller comprising: a metallic bush comprising a circumferential boss portion having a substantially truncated cone-shaped throttle portion positioned on a front surface axial end side, a periaxial support boss portion positioned in an axial center, and a circumferential protruding portion positioned on a back surface axial end side; and an impeller main body formed with a V-shaped bulging portion that bulges axially on a front surface center side of a disk-shaped vane portion fulcrum, in which a plurality of vanes are formed integrally on the periphery of the V-shaped bulging portion by a flow of synthetic resin from a disk gate portion, wherein an outer diameter of the circumferential protruding portion of the bush is formed to be smaller than an inner diameter of the disk gate portion, the throttle portion of the bush is formed with an outer diameter that is at least larger than the outer diameter of the circumferential protruding portion and smaller than the inner diameter of the disk gate portion, the circumferential protruding portion is positioned on a back surface side of the V-shaped bulging portion, and the bush is inserted into the V-shaped bulging portion.

An invention described in claim 3 for solving the problem described above is the impeller pertaining to the above constitutions, wherein a flat stepped surface forming a single step down in an axial direction is formed on the outside of a diametrical direction of the circumferential protruding portion. An invention described in claim 4 for solving the problem described above is the impeller pertaining to the above constitutions, wherein a corner angle portion between an outer peripheral side face of the circumferential protruding portion and the stepped surface is formed with a substantially arc-shaped cross-section.

An invention described in claim 5 for solving the problem described above is the impeller pertaining to the above constitutions, wherein a tip end surface of the circumferential protruding portion is formed to be flat, and an underfill amount of an angle portion with the outer peripheral side face is formed at no more than 0.3 mm.

According to the invention described in claim 1, the outer diameter of the circumferential protruding portion of the bush is formed to be smaller than the outer diameter of the axial end location of the throttle portion, and therefore the impeller of the present invention is molded simply by ensuring that the axial orientation of the bush is correct and that the impeller cannot be molded easily when the axial orientation of the bush is incorrect. In other words, the orientation of the bush must be correct in order to mold the impeller.

In the invention described in claim 2, the bush provided with the circumferential protruding portion, which is larger than the outer diameter of the throttle portion of the bush and smaller than the inner diameter of the disk gate portion of the die, and the throttle portion, which is formed with an outer diameter that is at least larger than the outer diameter of the circumferential protruding portion and smaller than the inner diameter of the disk gate portion, is attached to the die when molding the resin impeller, into which the bush is inserted, using a die. The correct gap is formed between the outer periphery of the circumferential protruding portion and the inner periphery of the disk gate portion only when the bush is attached to the die such that the circumferential protruding portion opposes the disk gate portion side, and as a result, molten resin flows into the gap to enable molding of the impeller.

Further, when the bush is attached to the die such that the throttle portion side faces the disk gate portion, the outer diameter of the throttle portion is larger than the inner diameter of the disk gate portion, and therefore the disk gate portion is blocked by the throttle portion, making it difficult for molten resin to enter the die.

When the bush is attached correctly to the die for molding the impeller, the impeller is molded such that the circumferential protruding portion of the bush is positioned on the axial back surface side of the impeller main body and the axial end (tip end) of the throttle portion is positioned on the front surface side of the impeller main body (V-shaped bulging portion). In other words, in all completely resin-molded impellers, the bush is inserted with the correct axial orientation, and therefore defective impellers can be eliminated. Hence, there is no need to perform a test to determine whether or not the axial direction of the bush is correct, and as a result, a testing process can be eliminated, productivity can be increased, and costs can be reduced.

Further, when the bush is attached to the die such that the throttle portion faces the disk gate portion, the disk gate portion is blocked by the throttle portion, as described above, and the impeller either cannot be molded or cannot be molded easily due to underfill. Note, however, that a part of the molten resin may flow into a molding void portion depending on the injection pressure of the molten resin. However, the disk gate portion is either blocked or smaller than the correct gap, and therefore, even if molten resin is injected into the die, the impeller main body cannot be molded completely, and a part of the form thereof is not molded, as shown in FIG. 6. In other words, the molded impeller main body takes a highly incomplete form such that the quality thereof can be determined instantly by the eye alone, enabling an improvement in testing efficiency.

According to the invention described in claim 3, the flat cylindrical circumferential protruding portion is formed at the axial end portion of the bush, and the stepped surface is formed on the outer periphery of the circumferential protruding portion in a lower position than the tip end surface. Thus, the thickness of the resin portion on the bush periphery at the back surface side of the impeller can be secured, and the strength of the resin portion of the impeller at the thin bush end can be secured. Furthermore, when performing resin molding using the die, unnecessary contact between the die surface (the joining surface of the die) on the outer periphery of the die gate and the opposing axial end portion of the bush can be avoided, and damage to the die and the bush can be prevented.

Hence, a favorable impeller can be molded without deformation of the bush, and the durability of the die can be improved. Also, the axial length of the bush need not be precise. The gap between the inner periphery of the gate and the outer periphery of the circumferential protruding portion of the bush can be made equal and constant such that when molten resin is introduced into the die, the resin can be introduced evenly into the molding void portion on the periphery of the circumferential protruding portion of the bush.

Further, when an unnecessary resin portion formed in the gate from residual resin remains adhered to the impeller main body after resin molding of the impeller main body is complete, the thickness of the impeller resin portion can be secured on the periphery of the bush, which serves as the base for cutting away the unnecessary resin portion, and therefore the unnecessary resin portion can be cut away from the impeller main body comparatively easily even when the resin joining the unnecessary resin portion to the impeller main body is thin and fragile.

According to the invention described in claim 4, the corner angle portion between the outer peripheral side face and the stepped surface of the circumferential protruding portion is formed with a substantially arc-shaped cross-section, and therefore stress concentration at the base of the thin circumferential protruding portion can be avoided, and the strength thereof can be increased so as to prevent deformation. Deformation of the bush is also prevented, and therefore the impeller resin portion can be formed favorably on the periphery of the bush.

According to the invention described in claim 5, the tip end surface of the circumferential protruding portion is formed flat, and the underfill amount of the angular portion with the outer peripheral side face is no more than 0.3 mm. Hence, the strength of the tip end portion of the thin circumferential protruding portion can be secured, the joint surface with the resin portion of the impeller can be increased in size, and the joining strength of the resin portion can be increased. Furthermore, a thin edge portion on the resin portion of the molded impeller at the tip end portion of the circumferential protruding portion can be made extremely small or substantially eliminated, and therefore the thin edge portion can be prevented from peeling, expanding and contracting during a cooling/heating cycle, and cracking as a result of forcible insertion. Accordingly, the strength of the impeller can be secured without decreasing.

DESCRIPTION OF THE PREFERRED EMBODIMENT

Figure 9:
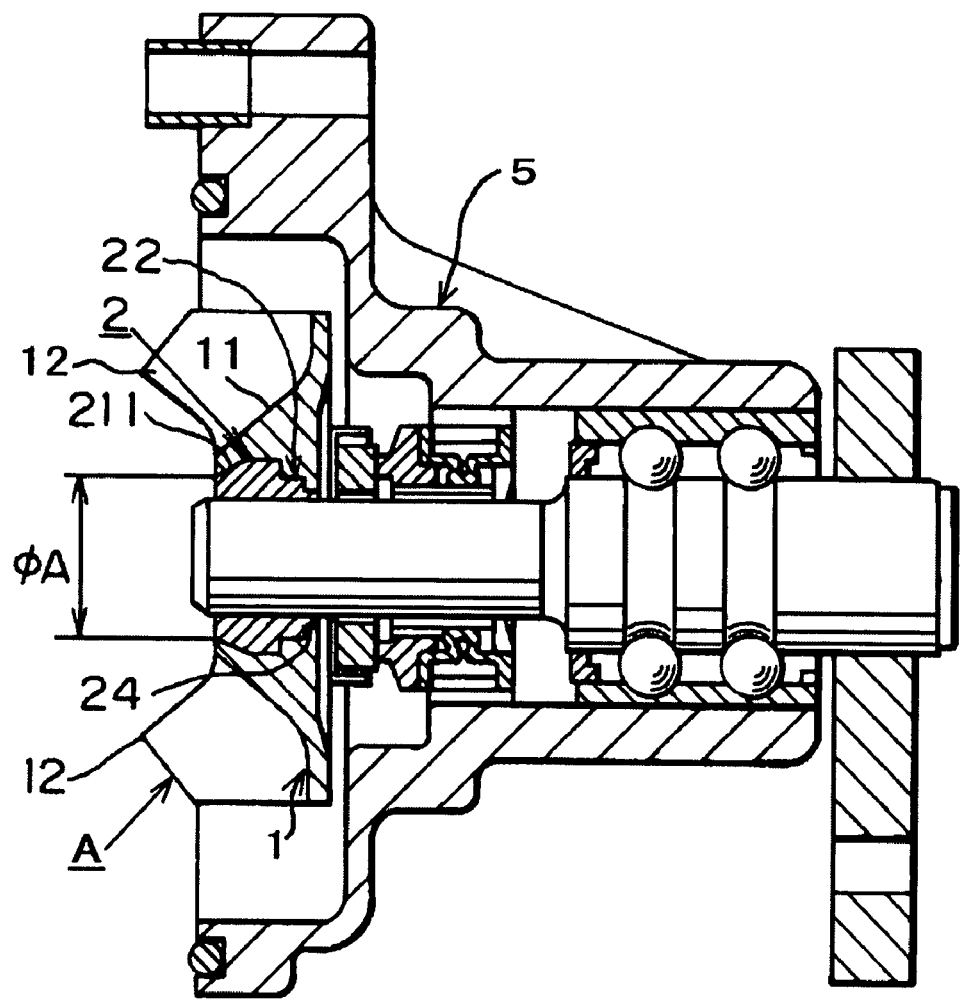
FIG. 9 shows a water pump to which the impeller of the present invention is attached.
Figure 10A:
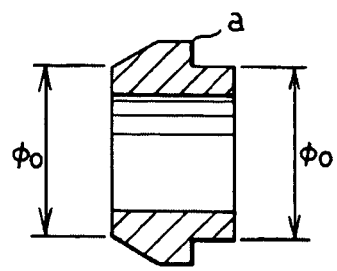
FIG. 10A is a side view showing a longitudinal cross-section of a bush according to the related art.
Figure 10B:
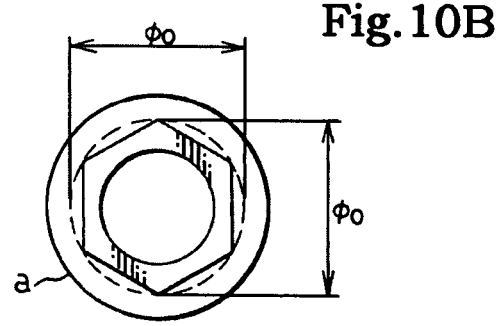
FIG. 10B is a back view of the bush.
Figure 10C:
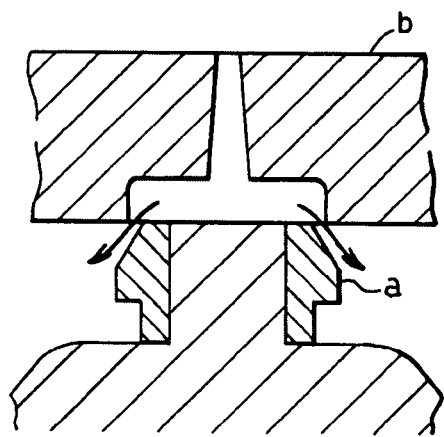
FIGS. 10C and 10D are process diagrams.
Figure 10D:
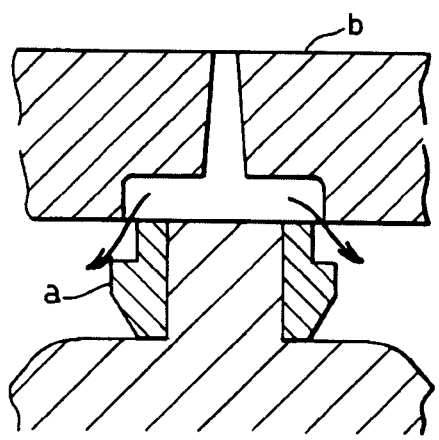
Figure 10E:
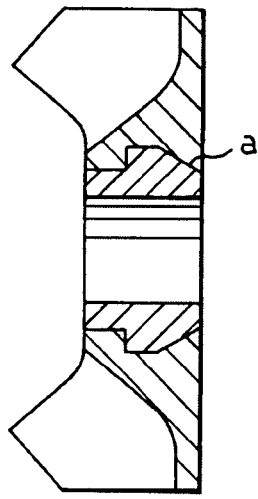
FIG. 10E is a sectional view of an impeller manufactured incorrectly due to the orientation of the bush being inverted.
Figure 10F:
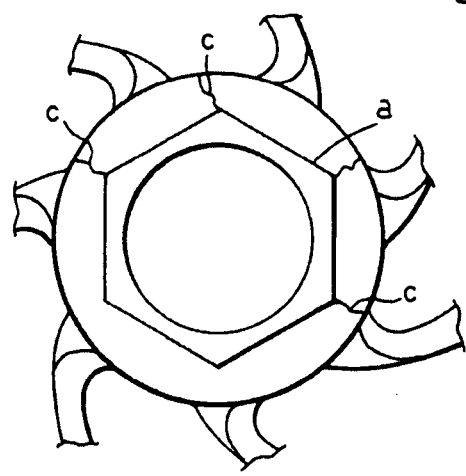
FIG. 10F is an enlarged view of the main parts of FIG. 10E.

An embodiment of the present invention will be described below on the basis of the drawings. First, an impeller of the present invention will be described. As shown in FIG. 9, a drive shaft is provided rotatably on a bearing attached to a pump casing 5 of a water pump. The impeller is attached to the drive shaft, and is constituted by an impeller main body A made of synthetic resin and a bush 2 made of metal. As noted above, the impeller main body A is formed from synthetic resin, and has a V-shaped bulging portion 11 formed in the center of a disk-shaped vane portion fulcrum 1.

Figure 1A:
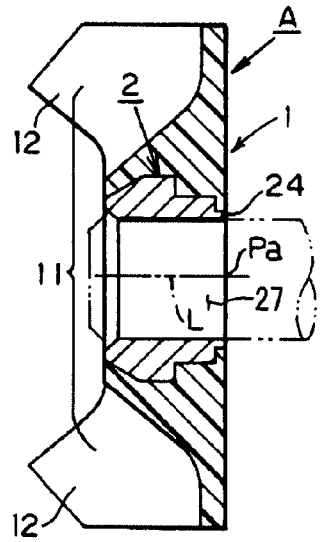
FIG. 1A is a side view showing a longitudinal cross-section of an impeller according to the present invention.
Figure 1B:
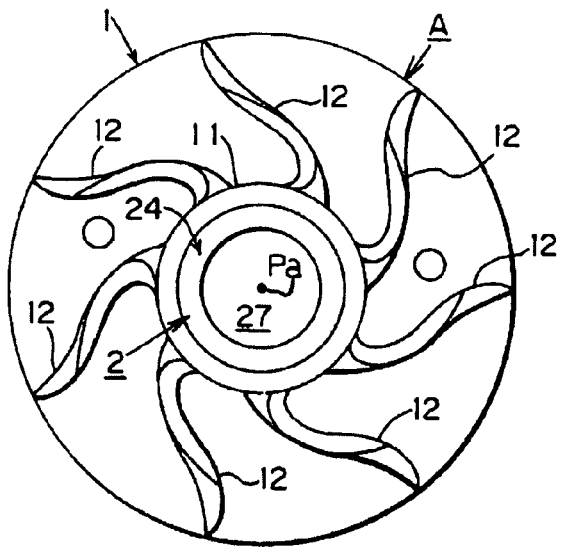
FIG. 1B is a front view of the impeller.

As shown in FIGS. 1A, 1B, the V-shaped bulging portion 11 is formed in a substantially truncated cone shape so as to protrude axially on the front surface side of the vane portion fulcrum 1. Further, a plurality of vanes 12, 12, . . . are formed in a substantially radial form on the periphery of the V-shaped bulging portion 11 and on the front surface side of the vane portion fulcrum 1. Here, the front surface side of the impeller main body A denotes a surface on the side where the V-shaped bulging portion 11 and the vanes 12 are formed. Further, a back surface side of the impeller main body A denotes a surface on the opposite side to the front surface side. In FIG. 1A, the left side corresponds to the front surface side and the right side corresponds to the back surface side. FIG. 1B shows the front surface side of the impeller main body A.

Figure 1C:
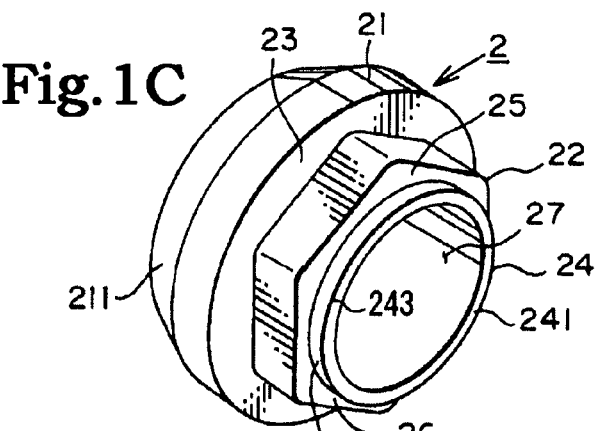
FIG. 1C is a perspective view of a bush.
Figure 1D:
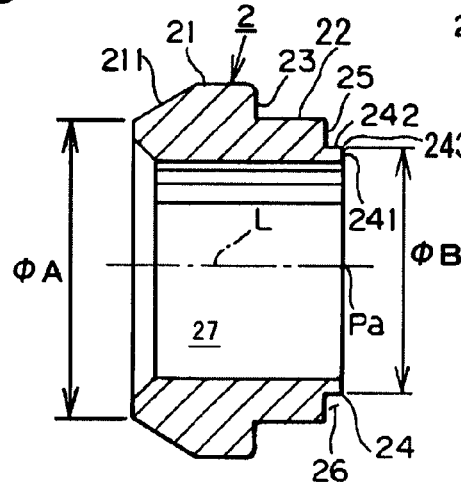
FIG. 1D is a side view showing a longitudinal cross-section of the bush.
Figure 1E:
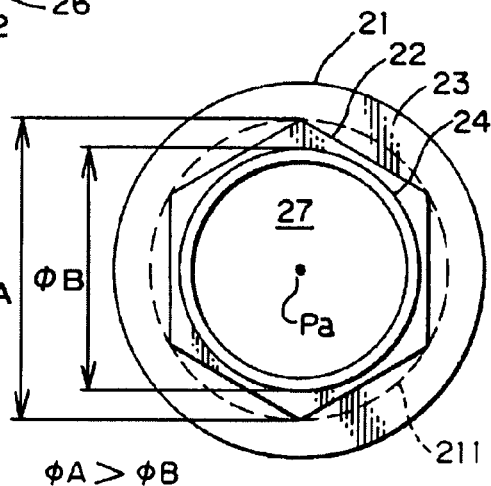
FIG. 1E is a back view of the bush seen from a circumferential protruding portion side.

The bush 2 is made of metal and, as shown in FIGS. 1C, 1D, and 1E, is constituted by a circumferential boss portion 21, a periaxial support boss portion 22, an axial support surface 23, a circumferential protruding portion 24, and a boss hole 27. More specifically, in the axial direction the bush 2 is constituted by the circumferential boss portion 21, which comprises a substantially truncated cone-shaped throttle portion 211 positioned on a front surface axial end side, the periaxial support boss portion 22 positioned in the axial center, and the circumferential protruding portion 24 positioned on a back surface axial end side. In FIG. 1D, an axial core line L is provided to indicate the axial direction. When the bush 2 is inserted into the V-shaped bulging portion 11 of the impeller main body A, an axial end portion corresponding to the front surface side of the impeller main body A in the axial direction of the bush 2 will be referred to as a front surface axial end portion, and an axial end portion corresponding to the back surface side of the impeller main body A will be referred to as a back surface axial end portion. Here, a tip end of the throttle portion 211 of the bush 2 serves as the front surface axial end portion, and the circumferential protruding portion 24 serves as the back surface axial end portion (see FIG. 1D).

The circumferential boss portion 21, periaxial support boss portion 22, axial support surface 23, and circumferential protruding portion 24 are molded integrally using a metal material. The circumferential boss portion 21 takes a cylindrical form, and the throttle portion 211 is formed on a part thereof.

A minimum diameter portion of the throttle portion 211 is positioned on the outermost axial end. The throttle portion 211 serves to adjust the thickness of a synthetic resin portion on the V-shaped bulging portion 11 of the impeller main body A and the thickness of the bush 2 appropriately.

The periaxial support boss portion 22 serves to fix the bush 2 to the impeller main body A in a rotary direction. The cross-section of the periaxial support boss portion 22 in an orthogonal direction to the axial direction is formed in a shape which makes idle rotation relative to the V-shaped bulging portion 11 of the impeller main body A impossible, i.e. a shape other than a coaxial circular shape. Specifically, the outer periphery of the periaxial support boss portion 22 takes a polygonal shape, which is typically hexagonal (see FIGS. 1C, 1E).

Further, the cross-section of the periaxial support boss portion 22 in an orthogonal direction to the axial direction may be formed in a square shape or a polygonal shape other than a hexagon. The cross-section of the periaxial support boss portion 22 in an orthogonal direction to the axial direction may also be formed in a circular shape, but in this case, idle rotation between the impeller main body A and the bush 2 is made impossible by forming a groove or a protrusion in the peripheral side face such that the resin forming the V-shaped bulging portion 11 digs into the groove or the protrusion digs into the resin portion of the V-shaped bulging portion 11.

Further, the axial support surface 23 serves to fix the bush 2 to the impeller main body A in the axial direction. The axial support surface 23 forms a step between the circumferential boss portion 21 and the periaxial support boss portion 22, and is formed as a flat surface which is substantially orthogonal to the axial direction. The bush 2 is disposed such that the back surface axial end portion thereof opposes a disk gate portion 312 of a die B, to be described below (see FIGS. 2, 3, and so on).

The circumferential protruding portion 24 is formed on the back surface axial end portion of the bush 2 (see FIGS. 1C, 1D). The circumferential protruding portion 24 is formed by shaping the axial end surface of the periaxial support boss portion 22 into a flat cylindrical shape, and is formed so as to protrude in a substantially annular form (wheel form or ring form). Further, an axial end surface (in the axial direction of the bush 2) of the circumferential protruding portion 24 is formed with a tip end surface 241 formed as a flat surface. A tip end surface taking the form of a curved surface also exists. A peripheral side face of the circumferential protruding portion 24 will be referred to as an outer peripheral side face 242.

Further, at the axial end portion of the bush 2, a flat stepped surface 25 is formed in a lower position than the tip end surface 241 (see FIGS. 1C, 1D). The stepped surface 25 serves as the location of a step between the periaxial support boss portion 22 and the circumferential protruding portion 24. In other words, by forming the circumferential protruding portion 24, a substantially corner angle-shaped recess portion 26 is formed on the periphery of the circumferential protruding portion 24. As will be described below, the recess portion 26 serves as the site to which molten resin flows.

In the circumferential protruding portion 24, an angular portion 243 is formed at an angle portion between the tip end surface 241 and the outer peripheral side face 242 (see FIG. 7). An underfill amount k of the angular portion 243 is formed at 0.3 mm or less. When the underfill amount k exceeds 0.3 mm, a thin resin portion is formed at the angle portion between the tip end surface 241 and outer peripheral side face 242 of the circumferential protruding portion 24, and during a cooling/heating cycle or when the drive shaft is forcibly inserted, the thin resin portion may peel or crack. In contrast, when the underfill amount k of the angular portion 243 is 0.3 mm or less, a thin resin portion is unlikely to form, and therefore, to make the thin resin portion either extremely small or non-existent, a value of 0.3 mm or less is applied to the angular portion 243 of the circumferential protruding portion 24.

Further, the angular portion 243 having an underfill amount k of 0.3 mm or less takes a tip end shape formed as a right angle or a substantial right angle. The tip end shape may take the form of an acute angle in which the underfill amount k is within a range not exceeding 0.3 mm, or instead of an acute angle, an apex surface of the tip end shape may take an arbitrary surface shape such as a plane or a curved surface. Further, instead of the tip end shape, an angle-finished portion 234a having an underfill amount k of no more than 0.3 mm may be formed. The angle-finished portion 234a is a site that is finished into an inclined surface (see FIG. 7C) or a rounded surface (see FIG. 7D) with an underfill amount k of 0.3 mm or less by trimming the right-angled angular portion 243 appropriately. The angle-finished portion 243a may be formed by chamfering, rounding, and so on. The underfill amount k is preferably set within a range of no more than 0.3 mm and no less than 0.05 mm. By setting the minimum value of the underfill amount k at 0.05 mm, burrs and cracks can be prevented from occurring on the apex portion of the acute angle, and a joint portion with the resin portion can be stabilized.

Figure 8:
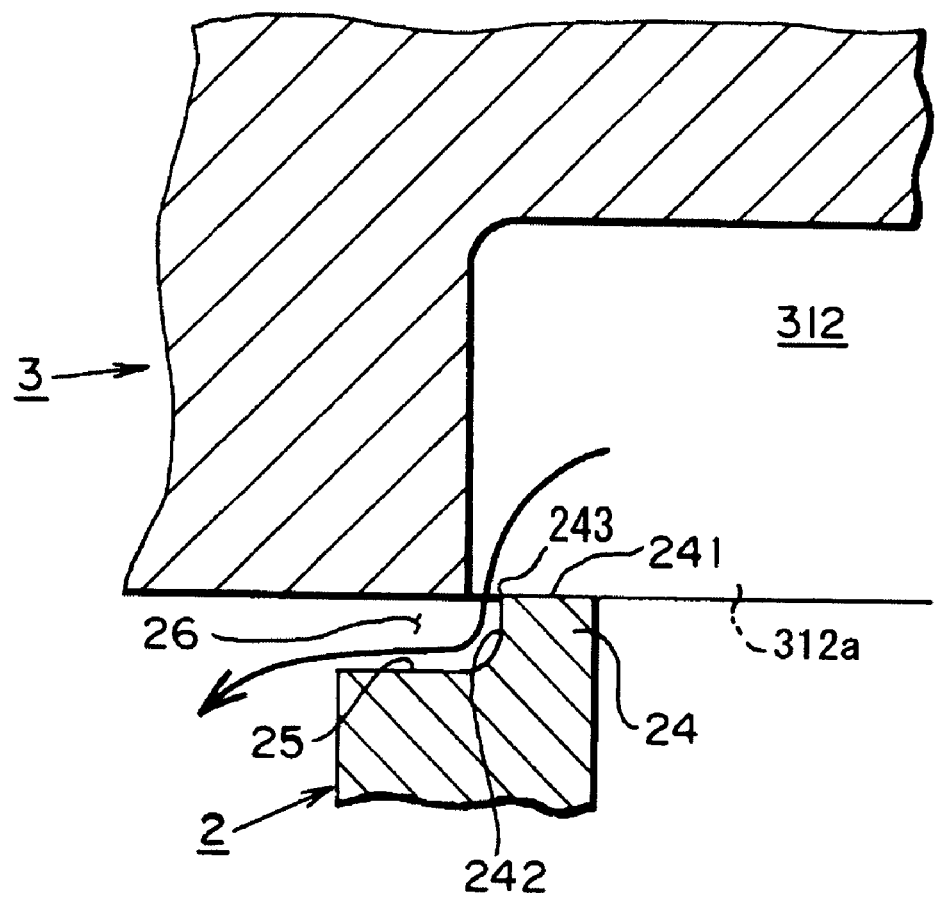
FIG. 8 is an enlarged view in which a corner angle portion of the circumferential protruding portion takes an arc form.

As shown in FIG. 8, a corner angle portion between the outer peripheral side face 242 and the stepped surface 25 may be formed with a substantially arc-shaped cross-section. By forming the corner angle portion in an arc shape, stress concentration at the base of the thin circumferential protruding portion 24 can be avoided, and the strength thereof can be increased so as to prevent deformation. Deformation of the bush 2 is also prevented, and therefore the impeller resin portion can be formed favorably on the periphery of the bush 2. Furthermore, when molten resin is introduced into the die B, the molten resin can flow favorably over the arc-shaped corner angle portion, and therefore the molten resin can flow evenly through the die B.

The diametrical center of the circumferential protruding portion 24 and the diametrical center of the boss hole 27 in the bush 2 are formed in identical positions, and therefore the circumferential protruding portion 24 and the boss hole 27 share an identical diametrical center Pa. An outer diameter $\phi B$ of the circumferential protruding portion 24 is set to be smaller than an inner diameter $\phi C$ of the disk gate portion 312. Further, an outer diameter $\phi A$ of the throttle portion 211 in the minimum diameter position of the front surface axial end portion is formed to be larger than the inner diameter $\phi C$ of the disk gate portion 312. Accordingly, a preferred magnitude relationship between these diameters is: outer diameter $\phi A \geqq$ inner diameter $\phi C >$ outer diameter $\phi B$.

Further, the outer diameter $\phi A$ of the throttle portion 211 may be set to be larger than the outer diameter $\phi B$ of the circumferential protruding portion 24 and smaller than the inner diameter $\phi C$ of the disk gate portion 312. In other words, the outer diameter $\phi A$ of the throttle portion 211 is formed to be larger than the inner diameter $\phi C$ of the disk gate portion 312, but as long as the outer diameter $\phi A$ is formed to be larger than the outer diameter $\phi B$, the outer diameter $\phi A$ may be formed to be smaller than the inner diameter $\phi C$. Hence, the outer diameter of the constitution described above is set at least such that the outer diameter $\phi A$ of the throttle portion 211 is larger than the outer diameter φB of the circumferential protruding portion 24 and smaller than the inner diameter φC of the disk gate portion 312.

Next, the die B for molding the impeller will be described. As shown in FIG. 2, the die B is constituted by a gate side die 3 and a molding side die 4. The gate side die 3 is formed with a gate 31, and molten resin is injected through the gate 31. The molding side die 4 is formed with an impeller molding void portion 41. The bush 2 is attached immovably to the impeller molding void portion 41.

Figure 2A:
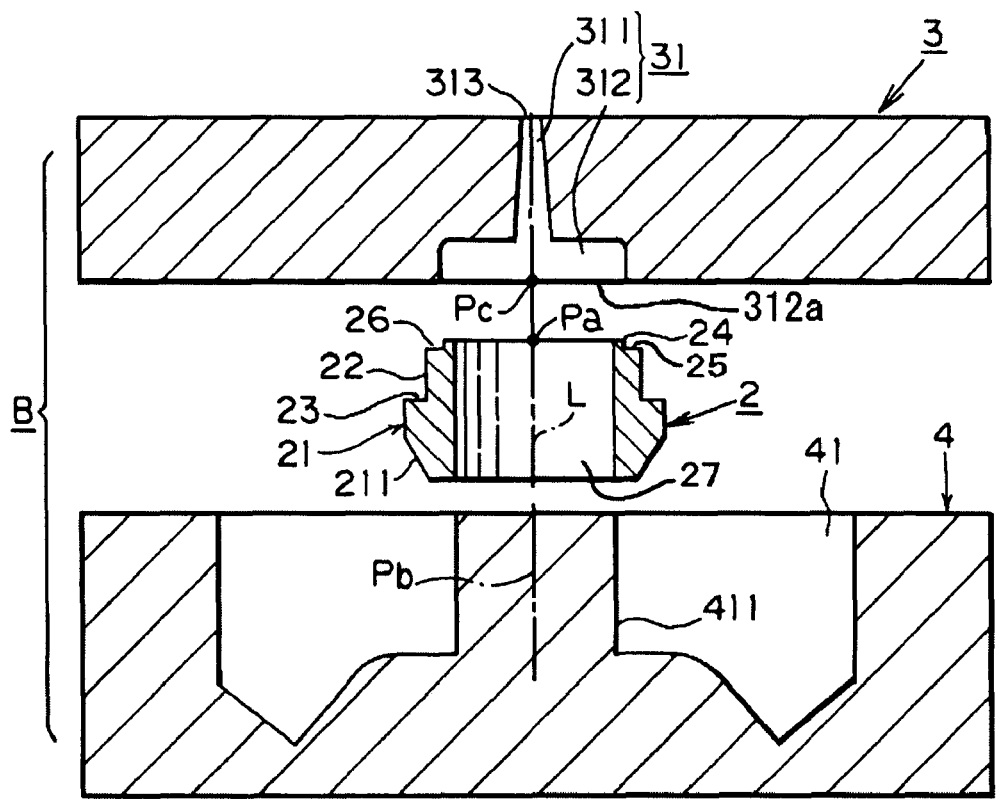
FIG. 2A is a sectional view of the bush when attached correctly to a die.
Figure 2B:
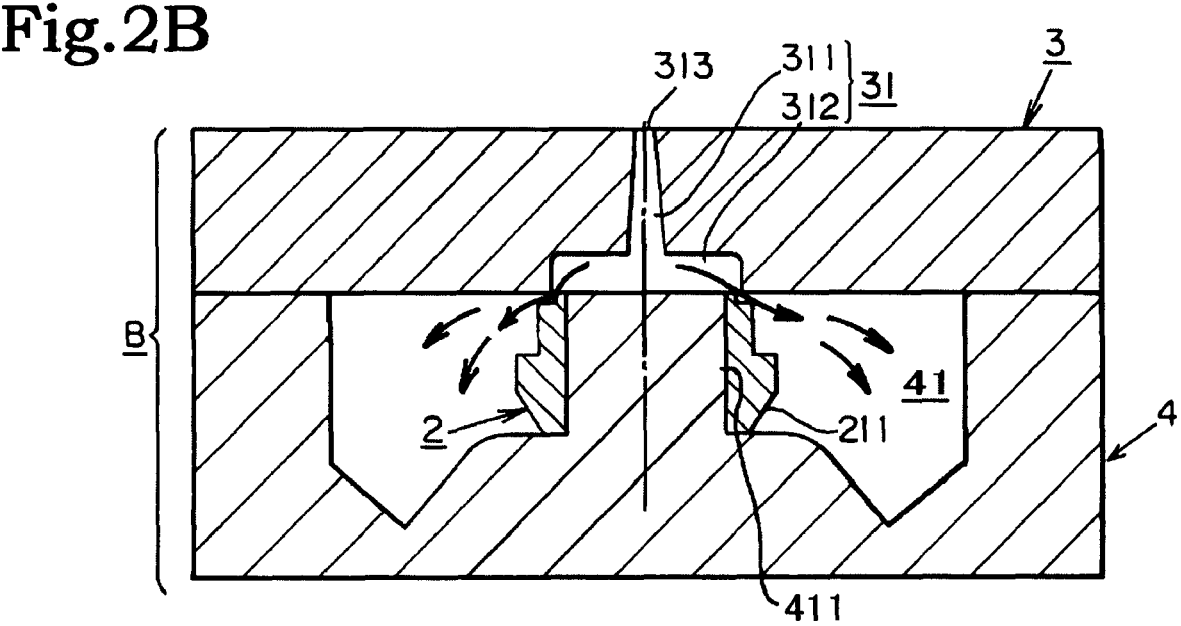
FIG. 2B is a sectional view of the die to which the bush is attached correctly.
Figure 3A:
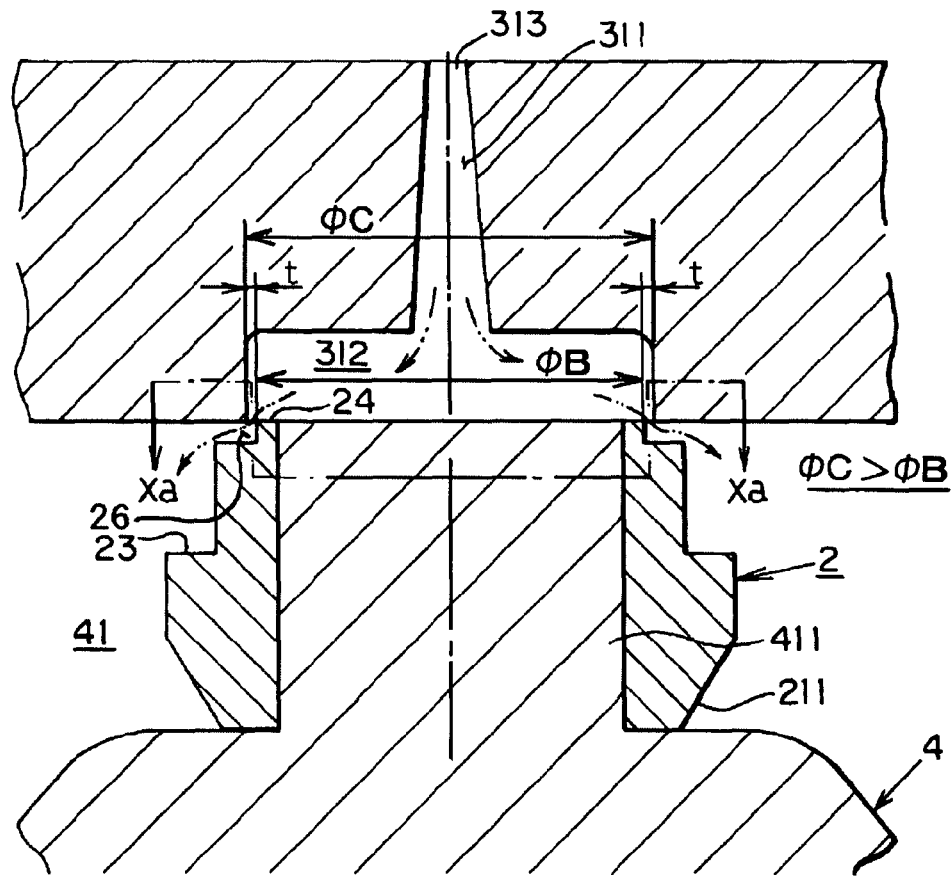
FIG. 3A is an enlarged sectional view of the correctly attached bush and a disk gate portion.
Figure 3B:
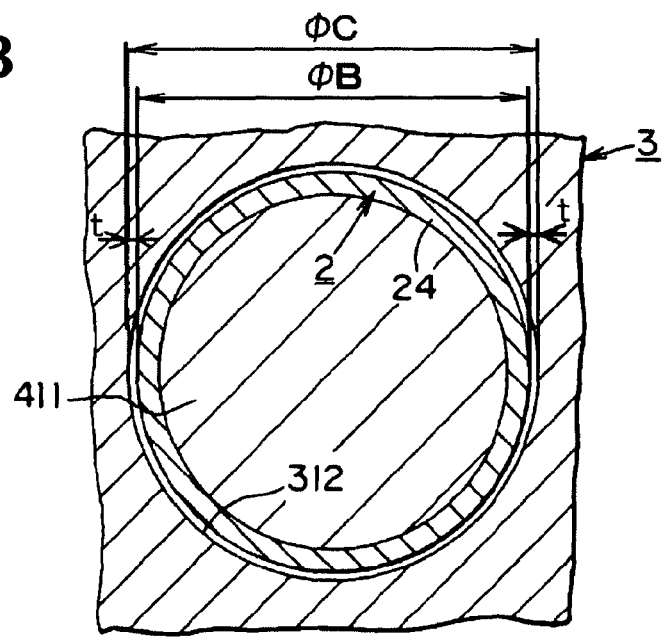
FIG. 3B is a sectional view taken along an arrow Xa-Xa of FIG. 3A.

The bush 2 is attached such that a center Pb of the impeller molding void portion 41 and the diametrical center Pa of the boss hole 27 in the bush 2 are set in identical positions (see FIG. 2). For this purpose, a positioning protruding portion 411 is formed in the impeller molding void portion 41. A specific example of the positioning protruding portion 411 is a cylindrical protrusion into which the boss hole 27 of the bush 2 is inserted. The positioning protruding portion 411 closes the boss hole 27 of the bush 2 in the axial direction and serves to ensure that molten resin does not enter the boss hole 27. Accordingly, the length of the positioning protruding portion 411 is formed to be equal to or slightly greater than the length of the boss hole 27 (see FIG. 2A).

The gate 31 is constituted by an injection passage portion 311 and the disk gate portion 312. The injection passage portion 311 connects an inlet 313 of the gate side die 3 to the disk gate portion 312. The injection passage portion 311 is a substantially conical passage. The injection passage portion 311 communicates with the disk gate portion 312 on the side where the inner diameter thereof gradually increases (see FIG. 2A). The disk gate portion 312 is a void portion formed in a flat cylindrical shape, and serves to introduce molten resin injected from the inlet 313 via the injection passage portion 311 evenly into the impeller molding void portion 41.

The disk gate portion 312 is open at a joint surface with the molding side die 4. This opening will be referred to as a gate open surface 312a. The inner diameter φC of the disk gate portion 312 is formed to be larger than the outer diameter +φB of the circumferential protruding portion 24 at the axial end portion of the bush 2. In other words, the inner diameter φC> the outer diameter φB (see FIGS. 2B, 3A). When the bush 2 is attached correctly to the impeller molding void portion 41 of the molding side die 4, the circumferential protruding portion 24 of the bush 2 faces the gate open surface 312a.

At this time, the outer form (diametrical) center Pa of the circumferential protruding portion 24 of the bush 2 matches the inner diameter center Pc of the disk gate portion 312. Further, a gap t is formed between the outer periphery of the circumferential protruding portion 24 and the inner periphery of the disk gate portion 312 (see FIG. 3). The gap t may be equal and constant in the circumferential direction, or substantially equal and constant. Slight variation in the dimension of the gap is permitted. The gap t is formed in accordance with the difference in magnitude between the inner diameter φC of the disk gate portion 312 and the outer diameter φB of the circumferential protruding portion 24 of the bush 2.

Figure 4A:
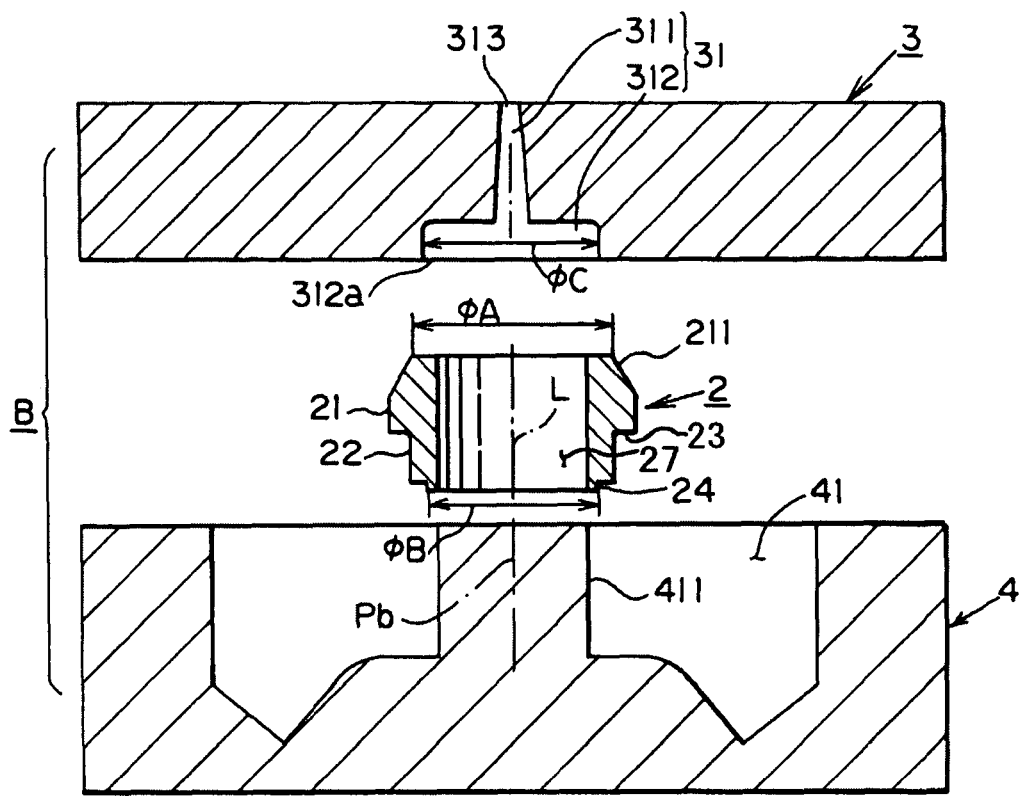
FIG. 4A is a sectional view of the bush when attached incorrectly to the die.
Figure 4B:
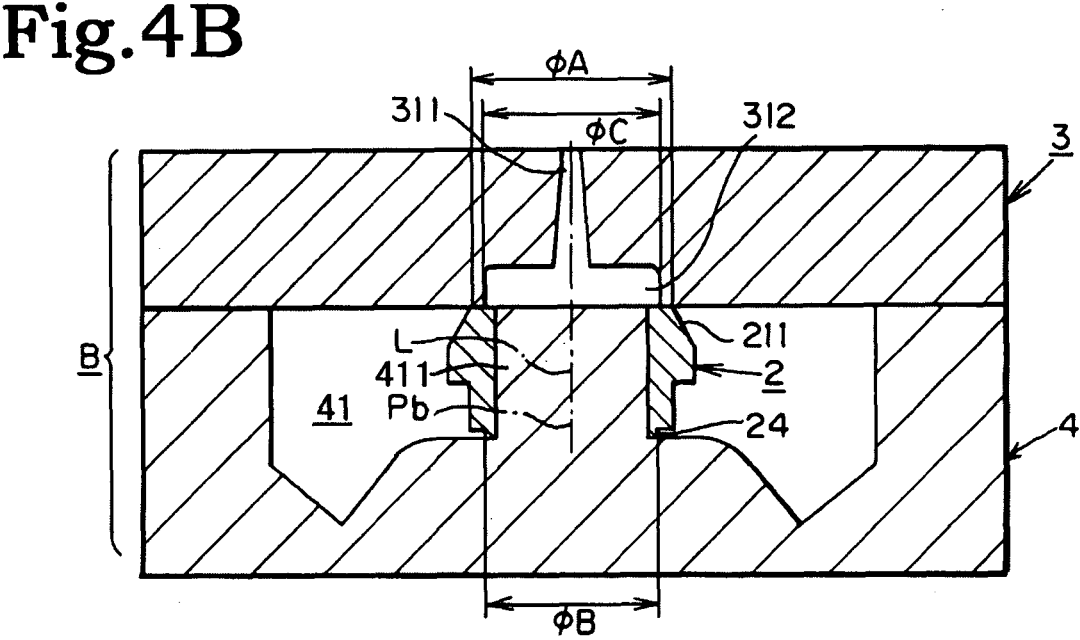
FIG. 4B is a sectional view of the die to which the bush is attached incorrectly.
Figure 5A:
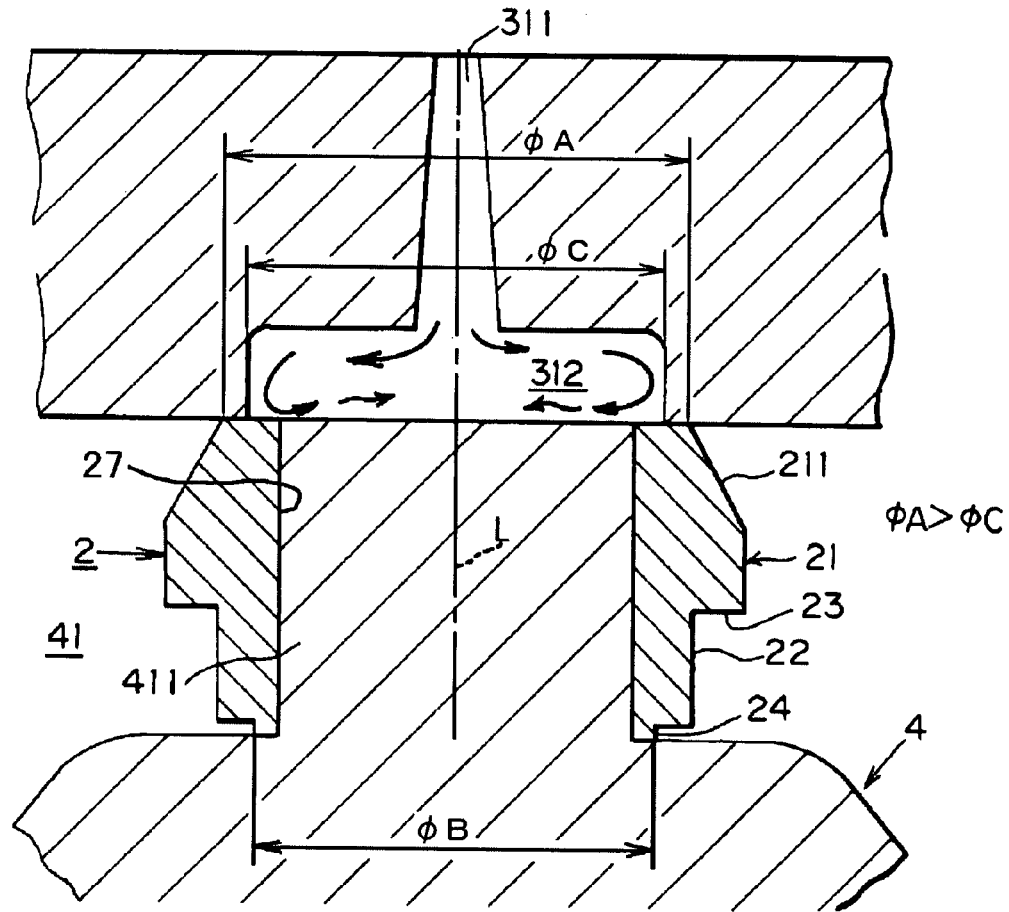
FIG. 5A is an enlarged sectional view of the incorrectly attached bush and the disk gate portion.
Figure 5B:
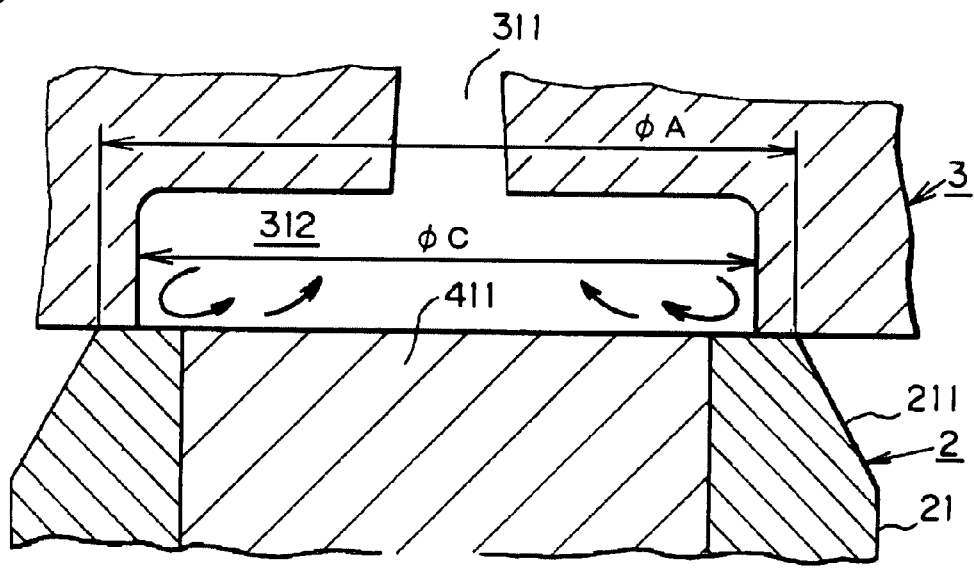
FIG. 5B is a sectional view showing the main parts of FIG. 5A enlarged further.

Further, the outer diameter φA of the throttle portion 211 at the front surface axial end portion of the bush 2 is formed to be larger than the inner diameter φC of the disk gate portion 312. Hence, as shown in FIG. 4, when the bush 2 is attached to the die B such that the throttle portion 211 faces the disk gate portion 312, the outer diameter φA of the throttle portion 211 is larger than the inner diameter φC of the disk gate portion 312, and therefore the disk gate portion 312 is blocked by the throttle portion 211 (see FIGS. 5A, 5B). As a result, molten resin cannot be introduced into the impeller molding void portion 41 through the disk gate portion 312.

Figure 6:
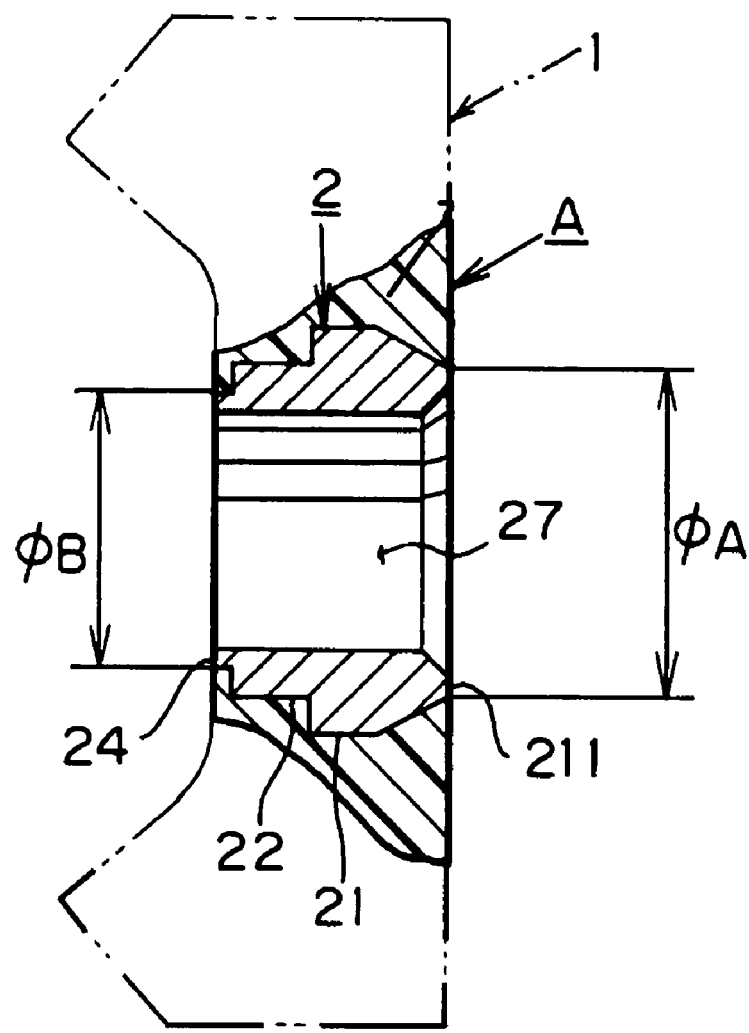
FIG. 6 is a sectional view of an impeller molded incompletely.
Figure 7A:
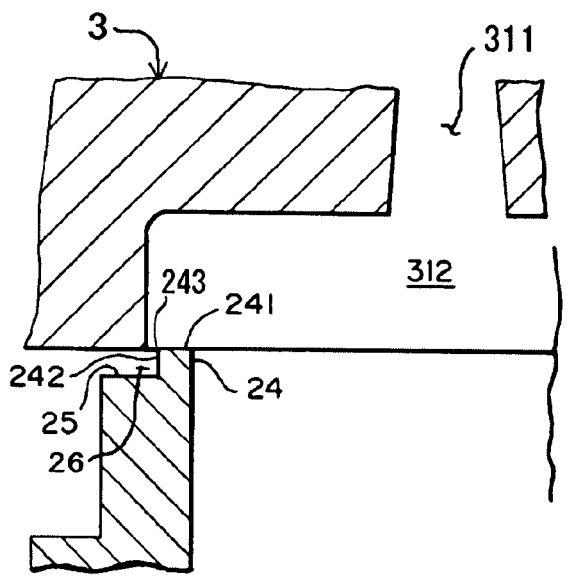
FIG. 7A is an enlarged principle sectional view showing the positional configuration of the disk gate portion and an axial end portion of the bush.
Figure 7B:
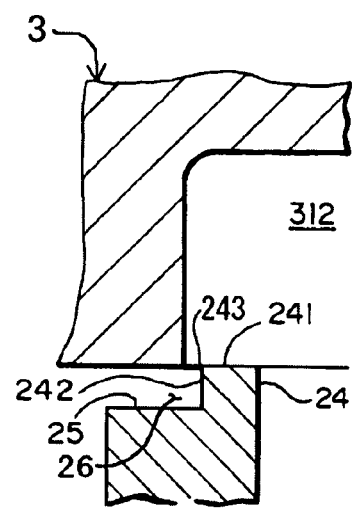
FIG. 7B is a sectional view enlarged further.
Figure 7C:
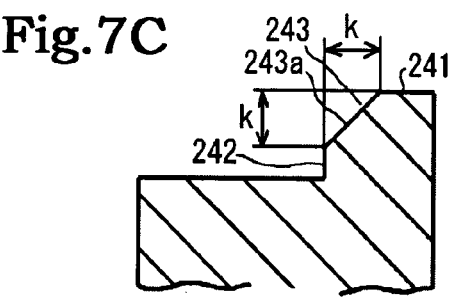
FIG. 7C is an enlarged sectional view of an angular portion formed with an inclined surface-shaped angle-finished portion.
Figure 7D:
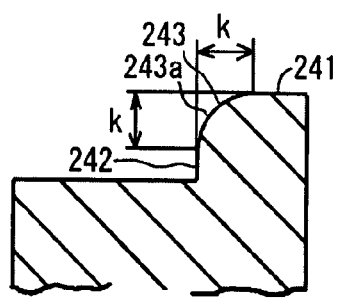
FIG. 7D is an enlarged sectional view of an angular portion formed with a rounded angle-finished portion.

When the bush 2 is attached to the die B such that the throttle portion 211 faces the disk gate portion 312 due to a mistake by an operator, the disk gate portion is blocked by the throttle portion, as described above. However, a part of the molten resin may flow into the impeller molding void portion 41 depending on the injection pressure of the molten resin. However, the disk gate portion 312 remains blocked, and therefore, even if molten resin is injected into the die B, the impeller main body A cannot be molded completely, and a part of the shape shown in FIG. 6 remains unformed.

In other words, the molded impeller main body takes a highly unfinished form, the quality of which can be determined instantly through visual confirmation, and hence the state of the impeller main body can be confirmed easily during the impeller molding process without the need for a separate testing process using human resources or apparatuses. Moreover, the testing efficiency can be improved. Similar effects can be obtained when the outer diameter φA of the throttle portion 211 is smaller than the inner diameter φC of the disk gate portion 312 and larger than the outer diameter φB of the circumferential protruding portion 24. In other words, when the outer diameter φA is smaller than the inner diameter φC, molten resin flows into the die B, but the molded impeller takes an incomplete form.

Thus, an impeller is formed such that the disk gate portion 312 is positioned on the back surface side of the impeller molding void portion 41, the circumferential protruding portion 24 of the bush 2 is positioned on the axial back surface side of the impeller main body A when the bush 2 is provided so as to face the disk gate portion 312, and the axial end (tip end) of the throttle portion 211 is positioned on the front surface side of the V-shaped bulging portion 11 of the impeller main body A. In other words, in all completely resin-molded impellers, the bush 2 is inserted with the correct axial orientation. Hence, there is no need to perform a test to determine whether or not the axial direction of the bush 2 is correct, and as a result, a testing process can be eliminated, and productivity can be increased.

What is claimed is:

1. An impeller, comprising:
    a metallic bush comprising a circumferential boss portion having a substantially truncated cone-shaped throttle portion positioned on a front surface axial end side, a periaxial support boss portion positioned in an axial center, and a circumferential protruding portion positioned on a back surface axial end side;
    an axial support surface serving as a step formed between said circumferential boss portion and said periaxial support boss portion;
    a stepped surface serving as a stepped location between said periaxial support boss portion and said circumferential protruding portion; and
    an impeller main body made of synthetic resin and formed with a V-shaped bulging portion that bulges axially in the center of a front surface side of a disk-shaped vane portion fulcrum, in which a plurality of vanes are formed integrally on the periphery of said V-shaped bulging portion,
    wherein an outer diameter of said circumferential protruding portion of said bush is formed to be smaller than an outer diameter of an axial end location of said throttle portion, said circumferential protruding portion is positioned on a back surface side of said V-shaped bulging portion, and said bush is inserted into said V-shaped bulging portion.

2. The impeller according to claim 1, wherein said stepped surface comprises a flat stepped surface forming a single step down in an axial direction formed on an outer side of said circumferential protruding portion.

3. The impeller according to claim 2, wherein a corner angle portion between an outer peripheral side face of said circumferential protruding portion and said stepped surface is formed with a substantially arc-shaped cross-section.

4. The impeller according to claim 3, wherein a tip end surface of said circumferential protruding portion is formed to be flat, and
wherein an underfill amount of an angle portion with said outer peripheral side face is formed at no more than 0.3 mm.

5. The impeller according to claim 1, wherein said axial support surface comprises a flat surface substantially orthogonal to an axial direction of the impeller.

6. The impeller according to claim 1, wherein a tip end surface of said circumferential protruding portion is formed to be flat.

7. The impeller according to claim 6, wherein the stepped surface is formed in a position lower than the tip end surface.

8. The impeller according to claim 1, wherein the stepped surface is disposed at an axial end portion of said metallic bush.

9. The impeller according to claim 1, further comprising a corner angle-shaped recess portion disposed on a periphery of the circumferential protruding portion.

10. An impeller, comprising:
a metallic bush comprising a circumferential boss portion having a substantially truncated cone-shaped throttle portion positioned on a front surface axial end side, a periaxial support boss portion positioned in an axial center, and a circumferential protruding portion positioned on a back surface axial end side;
an axial support surface serving as a step formed between said circumferential boss portion and said periaxial support boss portion;
a stepped surface serving as a stepped location between said periaxial support boss portion and said circumferential protruding portion; and
an impeller main body formed with a V-shaped bulging portion that bulges axially on a front surface center side of a disk-shaped vane portion fulcrum, in which a plurality of vanes are formed integrally on the periphery of said V-shaped bulging portion by a flow of synthetic resin from a disk gate portion,
wherein an outer diameter of said circumferential protruding portion of said bush is formed to be smaller than an inner diameter of said disk gate portion, said throttle portion of said bush is formed with an outer diameter that is at least larger than said outer diameter of said circumferential protruding portion and smaller than said inner diameter of said disk gate portion, said circumferential protruding portion is positioned on a back surface side of said V-shaped bulging portion, and said bush is inserted into said V-shaped bulging portion.

11. The impeller according to claim 10, wherein said stepped surface comprises a flat stepped surface forming a single step down in an axial direction formed on an outer side of said circumferential protruding portion.

12. The impeller according to claim 10, wherein said axial support surface comprises a flat surface substantially orthogonal to an axial direction of the impeller.

13. The impeller according to claim 10, wherein a tip end surface of said circumferential protruding portion is formed to be flat.

14. The impeller according to claim 13, wherein the stepped surface is disposed in a position lower than the tip end surface.

15. The impeller according to claim 10, wherein the stepped surface is disposed at an axial end portion of said metallic bush.

16. The impeller according to claim 10, further comprising a corner angle-shaped recess portion disposed on a periphery of the circumferential protruding portion.

17. The impeller according to claim 11, wherein a corner angle portion between an outer peripheral side face of said circumferential protruding portion and said stepped surface is formed with a substantially arc-shaped cross-section.

18. The impeller according to claim 17, wherein a tip end surface of said circumferential protruding portion is formed to be flat, and
wherein an underfill amount of an angle portion with said outer peripheral side face is formed at no more than 0.3 mm.

19. A pump, comprising:
a pump casing;
a drive shaft rotatably provided on the pump casing; and
an impeller, said impeller comprising:
a metallic bush comprising a circumferential boss portion having a substantially truncated cone-shaped throttle portion positioned on a front surface axial end side, a periaxial support boss portion positioned in an axial center, and a circumferential protruding portion positioned on a back surface axial end side;
an axial support surface serving as a step formed between said circumferential boss portion and said periaxial support boss portion;
a stepped surface serving as a stepped location between said periaxial support boss portion and said circumferential protruding portion; and
an impeller main body made of synthetic resin and formed with a V-shaped bulging portion that bulges axially in the center of a front surface side of a disk-shaped vane portion fulcrum, in which a plurality of vanes are formed integrally on the periphery of said V-shaped bulging portion,
wherein an outer diameter of said circumferential protruding portion of said bush is formed to be smaller than an outer diameter of an axial end location of said throttle portion, said circumferential protruding portion is positioned on a back surface side of said V-shaped bulging portion, and said bush is inserted into said V-shaped bulging portion.

* * * * *